April 16, 1957 D. H. BEAL ET AL 2,789,267
SYSTEM FOR TESTING PULSE GENERATORS
Filed May 26, 1953 2 Sheets-Sheet 2
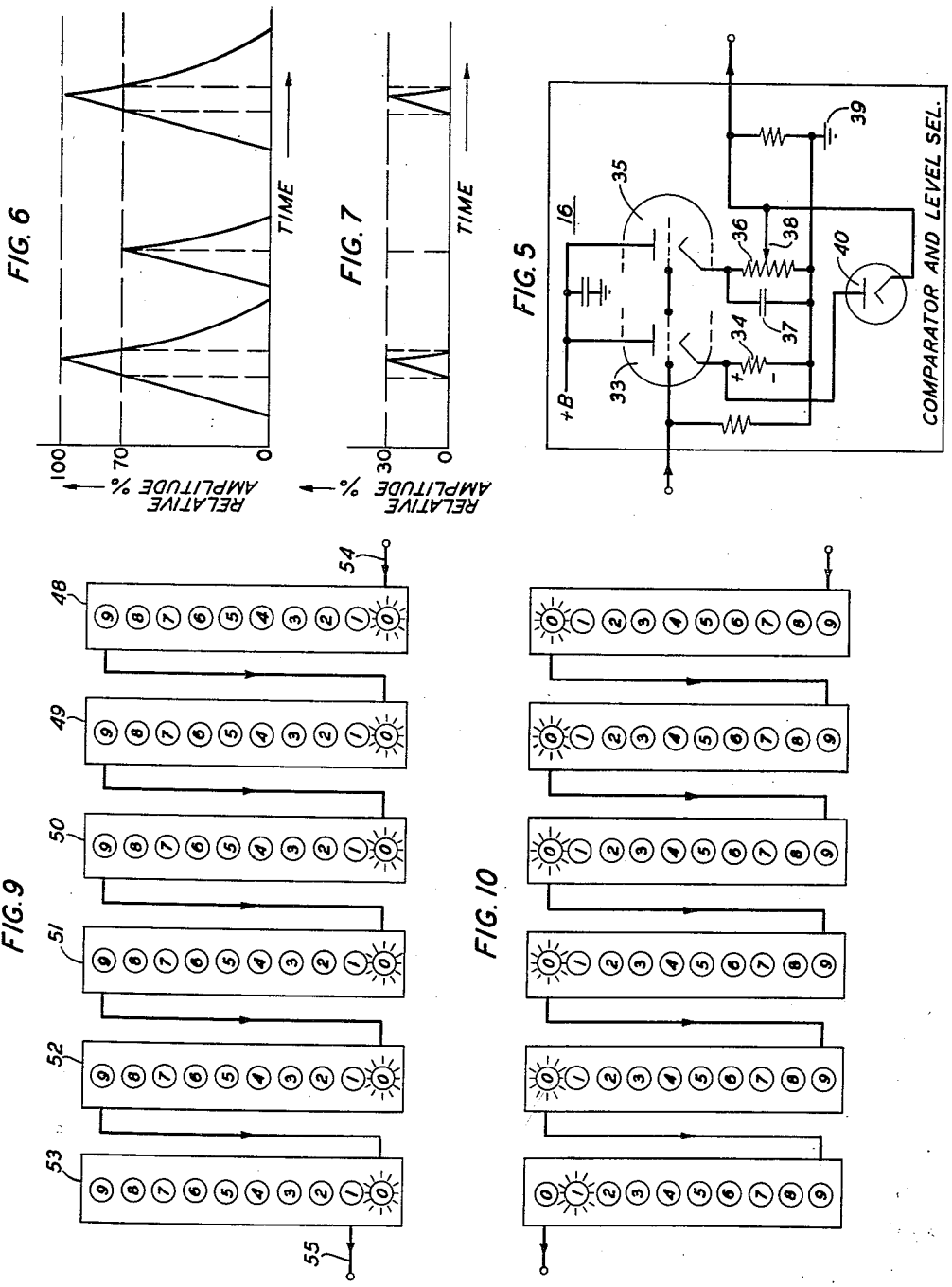
INVENTORS
D. H. BEAL
R. C. POMEROY
G. H. ROBERTSON
D. M. ZINN
BY Franklin Mohr
ATTORNEY

United States Patent Office 2,789,267
Patented Apr. 16, 1957

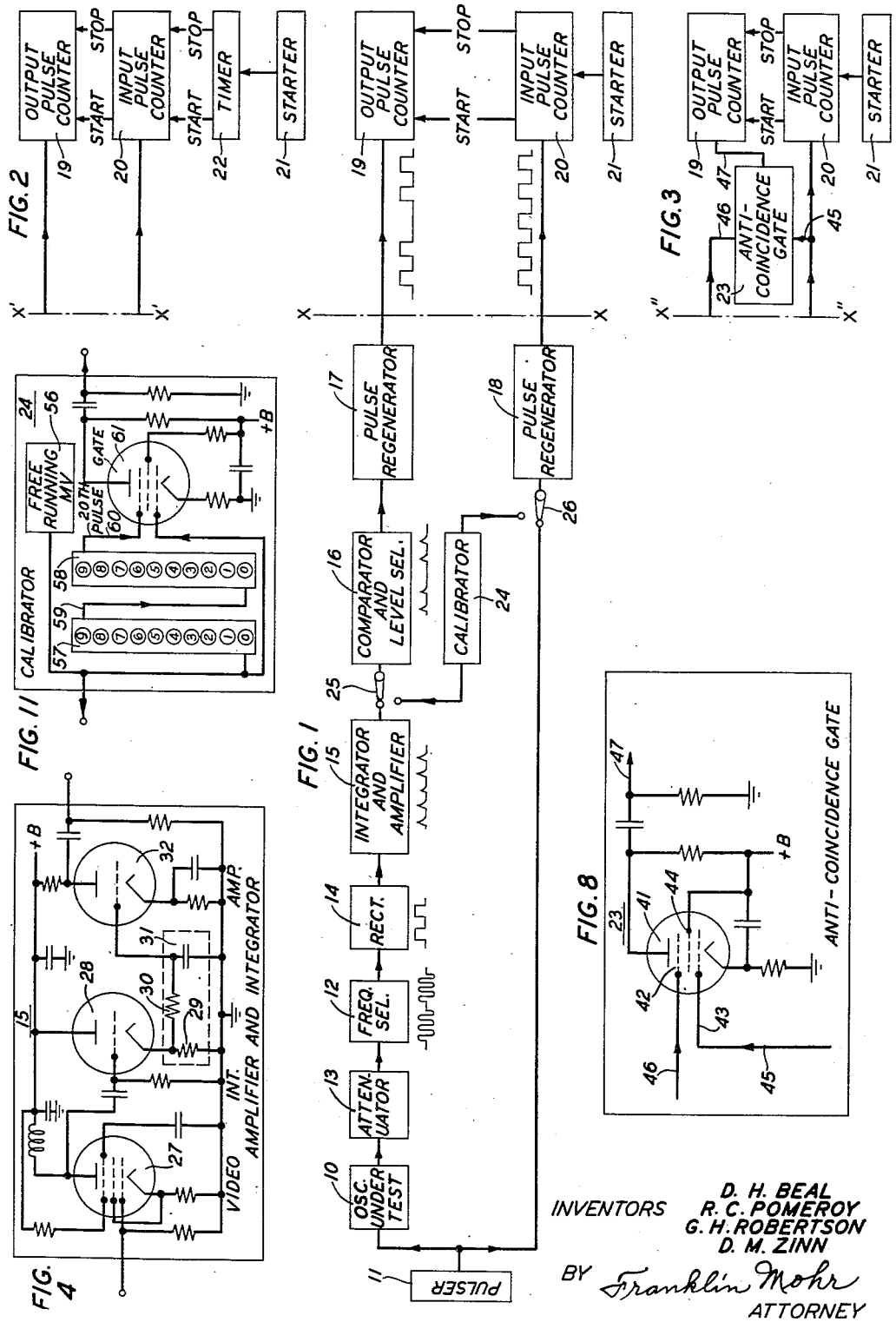

2,789,267

SYSTEM FOR TESTING PULSE GENERATORS

Dick H. Beal, Western Springs, Ill., Richard C. Pomeroy, Quakertown, Pa., and Gordon H. Robertson, La Grange Park, and Daniel M. Zinn, Elgin, Ill., assignors to Bell Telephone Laboratories, Incorporated, New York, N. Y., a corporation of New York Application May 26, 1953, Serial No. 357,594

20 Claims. (Cl. 324—57)

This invention relates to testing equipment and more particularly to systems for testing or monitoring the operating characteristics of an electrical device such as a pulse generator.

A need arises in testing and experimenting with oscillators, pulse generators, and the like, to measure the reliability of operation of the device under observation. The oscillations or pulses generated may vary in amplitude, duration, or repetition frequency and it may be desired to ascertain, over a period of a substantial number of pulses, what proportion of the pulses satisfy arbitrary requirements as to minimum amplitude, duration, and uniformity of spacing, etc. The source of the oscillations or pulses may be of the externally excited type, in which case the number of input pulses delivered to the source and the number of satisfactory output pulses may each be counted and the counts compared to determine, for example, the percentage of pulses that are missing or that do not meet the standard requirements.

In accordance with the invention, two pulse counting mechanisms are employed, each operating to count the number of pulses in one of the trains of pulses to be compared. One counting mechanism counts forward in the usual manner from a low initial number to a higher final number. The other counting mechanism may be forward counting or it may have its counting indicator arranged to count backward, i. e. from a high initial number to a lower final number. To measure the percentage of missing and substandard output pulses compared to the number of input pulses, the forward counting indicator is set to begin at zero and count to a selected number, which may conveniently be an integral power of ten, such as 10, 100, 1000, 1,000,000, etc. In the case of backward counting the indicator is set to begin at the number selected for the final count of the forward counting device. When an integral power of ten is so selected, the final reading of the backward counting indicator gives the desired percentage of missing pulses directly except for the position of the decimal point, which may be readily determined in a given case or may be shown automatically under control of a selective device which determines the final reading of the forward counting indicator.

The system of the invention is not confined in its usefulness to indicating the percentage of missing pulses in a selected number of possible pulses, but the system may be used to count the input pulses and the number of missing or substandard pulses within a measured time interval. The usefulness of the system is not limited to counting input and output pulses under circumstances where output pulses occur substantially simultaneously with the corresponding input pulses, it being possible to stop the application of input pulses to the source at any desired number and to permit the system to count output pulses over as long a period as may be required to include all the resulting output pulses.

In accordance with the invention, one or more selective devices are interposed between the source and the backward counting device to distinguish between standard and substandard output pulses. Such selective devices may be omitted if it is desired to count all output pulses that are able to actuate the counter and to register the number of pulses that are missing as distinguished from the number that are either missing or substandard.

In the drawings:

Fig. 1 is a block diagram of a system in accordance with the invention;

Figs. 2 and 3 are block diagrams showing alternative arrangements for a portion of the system shown in Fig. 1;

Fig. 4 is a schematic diagram of a suitable integrator and amplifier, and Fig. 5 is a schematic diagram of a comparator and level selector, for use as component parts of systems according to Figs. 1, 2, and 3;

Fig. 6 is a graphical representation of an input pulse train in a comparator as shown in Fig. 5;

Fig. 7 is a graphical representation of the output pulse train in the comparator of Fig. 5 corresponding to the input pulse train of Fig. 6;

Fig. 8 is a schematic diagram of an anticoincidence gate; Fig. 9 is a schematic diagram of a forward counting pulse counter; Fig. 10, of a backward counting pulse counter; and Fig. 11, of a calibrator; for use as component parts of systems according to Figs. 1, 2, and 3.

Referring to Fig. 1, an oscillator 10 or other generating device under test is arranged to be controlled or pulsed by a pulser 11. The output circuit of the oscillator is connected to a frequency selector 12 through an attenuator 13. From the frequency selector there extends a train of apparatus elements consisting of a rectifier 14, an integrator (and amplifier) 15, a comparator (and level control) 16, and a pulse regenerator 17. A similar pulse regenerator 18 is arranged to be pulsed by the pulser 11 simultaneously with the oscillator 10.

An output pulse counter 19 is connected to the output circuit of the pulse regenerator 17 and an input pulse counter 20 is connected to the output circuit of the pulse regenerator 18. The output pulse counter is so named because its function is to count pulses coming from the output circuit of the oscillator 10, while the input pulse counter is so named because it counts pulses impressed by the pulser 11 upon the input circuit of the oscillator 10. A starter 21 is provided for starting the counting operation of the input pulse counter 20, which latter is connected to the output pulse counter 19 for the transmission of a starting impulse to the latter. The counter 20 has another connection to the counter 19 for the transmission of a stopping impulse to the latter.

The operation of the arrangement of Fig. 1 is as follows. The pulser 11 intermittently energizes the oscillator 10 causing the latter to generate trains or pulses of oscillations in well known manner. The energizing impulse impressed upon the oscillator by the pulser is called an input pulse and the train of oscillations generated by the oscillator as a result of an input pulse is called an output pulse as hereinabove explained. The output pulse may be adjusted in amplitude as desired by means of the attenuator 13.

In accordance with a feature of the invention each output pulse is subjected to one or more tests to determine whether or not it shall be counted. The first test applied is a check of the frequency of the oscillations making up the output pulse. In the case of a magnetron oscillator it is known that the magnetron is capable of oscillation in more than one mode, each mode in general being characterized by a different frequency. The frequency selector 12 is arranged to pass the output pulse if the oscillations comprising the pulse are of the frequency of the desired mode, for example, the frequency of the commonly employed π-mode. If the pulse is of the wrong frequency it is not passed through the selector.

Pulses that pass the selector 12 are rectified by the rectifier 14 to obtain a rectified current pulse that has substantially the same shape as the envelope of the unrectified input pulse. The energy of the output pulse, is proportional to the area under the envelope of the output pulse, and therefore to the area of the rectified pulse. It is desired to evaluate the energy of the output pulse. The oscillator may fail to develop its full power, in which case the height of the output pulse will be less than normal. Or, the oscillator may develop full power during a part only of the pulse duration. In either of these cases or in any combination thereof, the pulse area will be less than normal for a perfect pulse. The integrator 15 gives a response to an incoming rectified pulse that is proportional to the area of the pulse. More particularly, the integrator produces a short pulse the height of which is proportional to the area of the incoming rectified pulse. As much amplification may be introduced in the integrator as necessary to develop a pulse of sufficient power for further use in the remainder of the train of apparatus leading to the output pulse counter.

The comparator 16 performs a continual measurement of the height of the pulses from the integrator and compares the height of an occasional short pulse with the average height of a number of immediately preceding pulses. The comparator is set to reject any pulse that falls belows a designated percentage of the average height so that such a deficient pulse will not operate the output pulse counter.

The pulse regenerators 17 and 18 are used when needed to insure pulses of desired shape, such for example as to produce reliable operation of the counters, and more particularly for providing input pulses and output pulses of identical shape when as in the system to be described in connection with Fig. 3 operation of the output pulse counter is conditioned upon coincidence or anticoincidence between input and output pulses.

The counters 19 and 20 count output pulses and input pulses respectively. The input pulse counter is started in operation by means of the starter 21 and the input pulse counter in turn passes a signal to the output pulse counter which starts the latter substantially simultaneously with the input pulse counter. The input pulse counter may be adjusted to count to any desired number, conveniently an integral power of ten, and then to shut itself off and pass a signal to the output pulse counter thereby shutting off the latter. The scale on the output pulse counter may be reversed so that the counter will count backward and thus end up with a final count that is the difference between the number of input pulses and the number of output pulses. Where the input count is an integral power of ten, the percentage of missing or defective pulses may be read directly from the scale of the output pulse counter.

In the arrangement of Fig. 2, a timing mechanism 22 is inserted between the starter 21 and the input pulse counter 20. The number of missing pulses in a given period of time may be ascertained by means of this arrangement, and the percentage of missing pulses in the same period of time may be calculated. The starter 21 causes a starting signal to be sent to the input pulse counter which in turn sends a starting signal to the output pulse counter. At the end of the predetermined period of time for which the timer 22 is adjusted, the timer sends a stopping signal to the input pulse counter which in turn sends a stopping signal to the output pulse counter.

While in the arrangements of Figs. 1 and 2, the output pulse counter is actuated in turn by each output pulse that passes the tests set up by means of the frequency selector 12 and the comparator 16, in the arrangement of Fig. 3, the counter 19 is actuated only when a pulse fails to pass the requirements of the testing devices. For this purpose an anticoincidence gate 23 is connected to the output circuits of the respective pulse regenerators 17 and 18. The pulse regenerator 18 is left connected to the input pulse counter 20 but the pulse regenerator 17 is no longer directly connected to the output pulse counter 19.

In the operation of the arrangement of Fig. 3, whenever an output pulse appears at the output of the pulse regenerator 17 it is matched by a substantially identical input pulse at the output of the pulse regenerator 18. These substantially identical pulses are compared in the anticoincidence circuit 23 and as a result no signal is passed to the counter 19 and the counter is not actuated. When, however, there is no output pulse to offset a given input pulse, the circuit 23 passes a signal to the counter 19 and the counter registers one unit. As in the case of the arrangements of Figs. 1 and 2, when the starter 21 is actuated, a starting signal is passed to the input pulse counter 20 which in turn passes a starting signal to the output pulse counter 20, empowering the latter counter to start counting any signals which may pass the anticoincidence gate 23. When the input pulse counter has reached its predetermined count it shuts itself off and sends a stopping signal to the output pulse counter thereby disabling the latter from further counting. As before, the percentage of missing pulses may be read off from the dial of the counter 19 as in the case of the arrangements of Figs. 1 and 2. Here the counter 19 is arranged to count forward in the usual manner.

Resetting means for restoring the counters to the proper initial readings may be provided as is well known in the art of counting devices. In the case of backward counting in the output pulse counter 19, the initial setting will be to the same number as the predetermined final reading of the input pulse counter 20, so that the counter 19 will indicate the number of missing and defective pulses.

A calibrator 24 is shown in Fig. 1, and may be connected to the system when needed by means of two single pore double throw switches 25 and 26, by placing switch 25 in the downward position and switch 26 in the upward position. The calibrator provides two inputs, one consisting of a train of pulses a fixed proportion of which are missing and the other consisting of an unbroken train of triggering pulses. The pulse train with missing pulses is impressed upon the input terminals of the comparator 16 in place of the pulse train from the integrator 15. The triggering pulses are impressed upon the pulse regenerator 18 in lieu of triggering pulses from the pulser 11. To restore the system to normal operation after calibration, the switch 25 is thrown to the upward position and the switch 26 to the downward position.

Certain of the component parts of the systems of Figs. 1, 2, and 3, will now be more particularly described.

In certain embodiments of the invention that have been constructed and successfully operated, the system has been particularly adapted for testing magnetron oscillators pulsed at repetition rates in the neighborhood of 2000 pulses per second and producing trains of oscillations having frequencies in the usual microwave range. The magnetron may have either coaxial cable output, wave guide output or other suitable output facilities. The pulser 11 may be of any conventional kind for generating suitable triggering pulses for activating the magnetron in intermittent manner as is common in practice.

The frequency selector 12 for use with a magnetron may be any known type of wave meter of the through transmission type, such for example as a cavity resonator with input and output apertures for wave guide installation, or with input and output probes for coaxial cable installation. The attenuator 13 may be of any of the types known to the art which are adapted for use in the frequency range of the oscillator. The rectifier 14 may be a crystal and may be mounted inside a wave guide or coaxial cable in accordance with known practice.

Fig. 4 shows the details of a suitable circuit for the integrator 15. Three stages of space discharge circuits are shown in order to provide suitable amplification and isolation between the rectifier and the integrating circuit as well as between the integrating circuit and the comparator 16. The first stage is a pentode 27 functioning as a wide-band amplifier such as is commonly employed in video amplifying systems. This stage is capable of amplifying the pulses formed by the rectifier 14 with small or negligible distortion of the wave form of the pulses. Hence, if the rectifier faithfully reproduces the envelope shape of the high frequency pulses from the magnetron, the envelope form will again be faithfully reproduced in the output pulse from the pentode 27.

The second stage of the integrator 15 is a triode 28 functioning in conventional manner as a cathode follower, reproducing the pulse from the pentode 27 in its cathode resistor 29. The integrator proper consists of a series combination of a resistor 30 and capacitor 31 which constitute the R and C respectively of a conventional RC integrating circuit wherein the potential of the capacitor follows the integrated value of the pulse in the cathode resistor. The final potential reached by the capacitor 31 when the impressed pulse terminates is a measure of the area of the pulse and hence of the area under the envelope of the high frequency pulse impressed upon the rectifier 14. The potential of the capacitor 31 falls off exponentially thereafter at a rate determined by the product RC as is well known, and the capacitor should be substantially discharged by the time the succeeding pulse arrives.

The third stage of the integrator 15 is a triode 32 which functions in known manner to amplify the height of the pulse impressed upon its grid from the capacitor 31. This stage is not required to preserve the wave form of the impressed pulse but it is merely required to provide linear amplification of the height of maximum potential of the pulse. The output of this stage therefor provides a pulse the height of which is again a measure of the area under the envelope of the high frequency pulse and of increased amplitude as may be required to insure reliable operation of the comparator 16.

Fig. 5 shows details of a circuit suitable for the comparator 16. It comprises two space discharge devices having their anode and cathode circuits connected in parallel to each other with respect to the anode current supply circuit and having their control grids directly connected together. The space discharge devices may be the two halves of a twin triode tube. One triode, designated 33, functions as a cathode follower presenting to incoming pulses a high impedance in the control grid path and reproducing the pulses in a low impedance circuit comprising the cathode resistor 34. The other triode 35 is provided with an RC cathode path comprising a potentiometer 36 and a capacitor 37. The time constant of the RC network 36—37 is made sufficiently large so that when the capacitor 37 is charged to the full potential of the received pulses, the capacitor will retain the charge with negligible leakage through the potentiometer 36 over a period of missing pulses of a duration which is the maximum period to be expected in using the device. In the embodiment tested the time constant was sufficiently large to take care of a succession of 200 missing pulses. On the other hand, if the magnetron is tunable and its output power is a function of the frequency generated, the potential in the network 36—37 will adjust to a new value after a predetermined time such as a few seconds, thereby making the device conveniently adaptable to variable power conditions. The slider 38 of the potentiometer 36 may be used to select any desired portion of the full potential of the potentiometer for comparison with the pulse in the resistor 34. The potentials thus to be compared are opposed to each other in a series circuit comprising the resistor 34, the portion of the potentiometer between the slider 38 and ground 39, and a unidirectional conductor shown as a diode 40. The potential across the selected portion of the potentiometer constitutes a biasing potential for the diode 40, the positive potential of the slider 38 of the potentiometer being impressed upon the cathode of the diode. The biasing potential blocks current from passing through the diode unless and until the biasing potential is exceeded by the potential developed across the resistor 34 during the transmission of a pulse. Thus it is only the portion of the pulse that exceeds the biasing potential that is passed to the pulse regenerator 17 by the comparator 16.

Illustrative representations of input pulses and output pulses in the comparator 16 are shown in Figs. 6 and 7 respectively for the case where the slider 38 is adjusted to select 70 percent of the maximum amplitude of the input pulse. By moving the slider 38 along the potentiometer 36 other percentages may be selected and the potentiometer may be calibrated in known manner to indicate the proper position of the slider for the desired percentage. The function of the comparator may be described as that of a proportional amplitude discriminator.

The device of Fig. 5 is disclosed and claimed per se by R. C. Pomeroy, one of the joint applicants herein, in a copending sole application for Proportional Amplitude Discriminator, Serial No. 361,233, filed June 12, 1953.

The pulse regenerators 17 and 18 may be conventional triggered multivibrators. While these components may be omitted if desired, their inclusion is generally advantageous. One function of these components is to produce an output pulse of uniform shape and size for each input pulse applied, thus insuring reliable operation of the counters 19 and 20. Another function is to provide substantially identical pulses for comparison in the anticoincidence gate 23, since comparison of dissimilar pulses is unsatisfactory and conducive to error.

Fig. 8 shows details of a suitable anticoincidence device for use as the gate 23 in the system of Fig. 3. A pentode 41 has two input circuits, one connected to the outermost grid electrode 42 and the other connected to the innermost grid electrode 43. A screening electrode 44 is positioned between the grids 42 and 43. The pentode will not pass a pulse unless grids 42 and 43 are both biased to proper potentials. For the purposes of the gate 23, a pulse from the pulse regenerator 18 is applied through a lead 45 to grid 43 placing an enabling bias thereon. A pulse from the pulse regenerator 17 is applied through a lead 46 to the grid 42 placing a disabling bias thereon. Under these conditions, if pulses are applied in coincidence upon the grids 42 and 43, no pulse is transmitted through the gate, but if a pulse is applied to grid 43 when no pulse is applied to grid 42, the enabling bias on grid 43 enables a pulse to pass, this pulse appearing at the output lead 47. There is therefore produced and impressed upon the output pulse counter 19 in Fig. 3 one pulse for each missing or substandard pulse of the output pulse train from the oscillator 10 under test. In Fig. 3, the input pulse train or train of triggering pulses is impressed also directly upon the input pulse counter 20. In this case the counters 19 and 20 are both arranged to count forward, counter 19 registering missing and substandard pulses and counter 20 registering all triggering pulses.

Fig. 9 shows an arrangement of conventional decimal counting units suitable for use in a forward counting pulse counter such as the input pulse counter 20 in Figs. 1, 2, and 3 and the output counter 19 when used with the anticoincidence gate 23 in Fig. 3. Any desired number of decimal counting units may be employed. These units may be of any known type which can be operated by electric pulses such as those supplied by the pulse regenerators 17 and 18 or the gate 23. By way of illustration, six decimal counting units are shown, schematically, giving a counting capacity of 999,999. The units are designated 48 through 53, beginning with the units counter 48 and ending with the hundred-thousands counter 53. Pulses entering the device of Fig. 9 from the right through an input lead 54 operate the units counter 48 successively from 0 to 9 and upon the arrival of the tenth pulse, the units counter 48 is returned to 0 and the tens counter 49 is advanced to 1, in well known manner common to counting devices in general. An initial reading of 000,000 is shown schematically by lights illuminating the corresponding digits on the respective counters. Lead 55 represents an output lead arranged to produce a signal, such as a stop signal for controlling the output pulse counter 19 to stop the latter when an input pulse count of 100,000 has been reached. Alternatively, an output lead such as lead 55, or a suitable set of output leads, may be arranged to be energized at a total input count of any integral power of 10 within the range of the counter or at any number in between such powers of 10.

Fig. 10 shows how the scales on the various counters of Fig. 9 can be inverted to provide a backward counting pulse counter for use as output pulse counter 19 in the arrangements of Figs. 1 and 2. The scales of all the counters are simply changed to read from 9 back to 0 instead of from 0 forward to 9, each digit being replaced by the difference between that digit and 9. The register in Fig. 10 is shown with an initial reading of 100,000 exhibited. This is equivalent to setting the counters of Fig. 9 to an initial reading of 899,999. It will be evident that the application of 100,000 successive pulses to the arrangement of Fig. 10 will produce a final reading of 000,000 which is equivalent to a reading of 999,999 in the arrangement of Fig. 9. That the arrangement of Fig. 10 will count backward will be evident from an example, wherein 99,500 pulses are applied to the arrangement of Fig. 10, thereby advancing the count from 899,999 to 999,499 in terms of the arrangement of digits on the counters in Fig. 9. The number 999,499 in the normal arrangement, Fig. 9, corresponds to the number 000,500 in the inverted arrangement of Fig. 10, thereby registering the correct number of missing pulses, namely 100,000 minus 99,500, or 500 missing pulses.

Fig. 11 shows details of a calibrator suitable for use as calibrator 24 of Fig. 1 and arranged, for example, to provide a calibrating condition of one missing pulse for each twenty triggering pulses. A free-running multivibrator 56 is utilized to supply triggering pulses in place of those obtained in ordinary use from the pulser 11, and also to produce trains of 19 pulses followed by a missing pulse interval. Two units counters 57 and 58 are used. Pulses from the multivibrator 56 are applied to counter 57 to advance it from 0 to 9. The tenth and following pulses pass through a lead 59 to advance the counter 58 from 0 to 9. Here the connections between the counter 57 and 58 differ from the connections between unit counter 48 and tens counter 49 of Fig. 9. The twentieth pulse passes through a lead 60 to one of the control grids of a gate 61. All pulses are applied successively to the second control grid of the gate 61. The gate 61 is arranged for anticoincidence, passing a pulse except when pulses are applied simultaneously to both control grids. As thus arranged, 19 pulses pass through and the twentieth pulse is blocked by the gate 61. The twentieth is also employed to reset counters 57 and 58 each to zero. Other patterns of pulses and misses may readily be arranged in the calibrator 24 as will be evident to those skilled in the art.

With the calibrator 24 set for any desired proportion of missing pulses, with the switch 25 in the downward position and the switch 26 in the upward position, the system of Figs. 1, 2, or 3, may be checked for accuracy. Assuming that the calibrator is set up to supply 5 percent missing pulses, for example, and a trial measurement using 100,000 triggering pulses is made in the system of Fig. 1 or Fig. 3, the result should be 5000 missing pulses. In the system of Fig. 2, the ratio of missing pulses to total triggering pulses should be exactly 5 to 100. Any departure from the expected result will be indicative of improper operation of the portion of the system tested.

The gate 61 may be adjusted to pass all pulses but to reduce the height of the twentieth pulse to any desired part of the normal height. For example, the twentieth pulse may be reduced to 70 percent of normal height. In this case if the comparator 16 is set to select a 70 percent level, that is, to be unresponsive to any pulse that does not exceed 70 percent, then the twentieth pulse will be counted as missing. The level selector adjustment of the potentiometer arm 38 when suitably calibrated may be used in setting the gate 61 to reduce the twentieth pulse to the proper amount so that it will just fail to be selected and will therefore be counted as missing.

When adjusted to a given percentage height in the level selector, the systems of Figs. 1, 2, and 3 will count as missing all pulses that are below the selected percentage height.

It is to be understood that the above-described arrangements are illustrative of the principles of the invention. Numerous other arrangements may be devised by those skilled in the art without departing from the spirit and scope of the invention.

What is claimed is:

1. A direct-reading system for indicating the percentage of failures of a given device in response to a plurality of excitations of the given device, comprising means to excite the given device repetitively, means to count the individual excitations of the given device, means actuated by individual responses of the given device to display one by one a series of indicia representing the cardinal numbers in descending order from a given integral power of ten down to zero inclusive, means to start the said counting means and the said display means substantially simultaneously, and means actuated by said counting means to stop the said display means at the end of a number of excitations of the given device equal to the said given integral power of ten.

2. A direct-reading system for indicating the percentage of substandard responses of a given device, comprising selective means connected to the output circuit of the given device to discriminate against substandard responses thereof, means actuated by such responses of the given device as are accepted by said selective means to display one by one a series of indicia representing the cardinal numbers in descending order from a given integral power of ten down to zero inclusive, means to excite the given device repetitively, means to count the individual excitations of the given device, means to start the said display means and the said counting means simultaneously, and means to stop the said display means at the end of a number of excitations of the given device equal to the said given integral power of ten.

3. A direct-reading system for indicating the percentage of substandard responses of a given device, comprising pulse generating discriminatory means connected to the output of the given device to discriminate against substandard responses of the given device, said means producing a pulse for each passable response of the given device, pulse actuated means to display one by one a series of indicia representing the cardinal numbers in descending order from a given integral power of ten down to zero inclusive, said last-mentioned means being connected to the said pulse generating means, means to excite the given device repetitively, means to count the individual excitations of the given device, means to start the said excitation counting means and the said numerical display means simultaneously, and means to stop the said display means at the end of a number of excitations of the given device equal to the said given integral power of ten.

4. A system for determining the percentage of missing output pulses from a pulse source in response to a train of input pulses, comprising a pulse counter connected to the input circuit of the pulse source, means actuated by individual output pulses from the pulse source to display one by one a series of indicia representing the cardinal numbers in descending order from a given integral power of ten down to zero inclusive, means to start the said counter and the said display means substantially simultaneously, and means actuated by said counter to stop the said display means when the counter has registered a number of input pulses equal to the given integral power of ten.

5. A system for indicating the number of responses of a given device to a given number N of excitations of the device, comprising means to excite the given device repetitively, means to count the individual excitations of the given device, means actuated by individual responses of the given device to display one by one a series of indicia representing the cardinal numbers in descending order from N to zero inclusive, means to start the said counting means and the said display means substantially simultaneously, and means actuated by said counting means to stop the said display means at the end of N excitations of the given device.

6. A system for indicating the number of substandard responses of a given device to a given number N of excitations of the device, comprising selective means connected to the output circuit of the given device to discriminate against substandard responses thereof, means actuated by such responses of the given device as are accepted by said selective means to display one by one a series of indicia representing the cardinal numbers in descending order from N to zero inclusive, means to excite the given device repetitively, means to count the individual excitations of the given device, and means actuated by said counting means to stop said display means at the end of N excitations of the given device.

7. A system for indicating the number of substandard responses of a given device to a given number N of excitations of the device, comprising pulse generating discriminatory means connected to the output of the given device to discriminate against substandard responses of the given device, said means producing a pulse for each acceptable response of the given device, pulse actuated means to display one by one a series of indicia representing the cardinal numbers in descending numerical order from N to zero inclusive, said last-mentioned means being connected to the said pulse generating means, means to excite the given device repetitively, means to count individual excitations of the given device, and means actuated by said counting means to stop said display means at the end of N excitations of the given device.

8. A system for measuring the proportionate number of responses of a given device with respect to the number of excitations of the given device, comprising means to excite the given device repetitively, means to count the individual excitations of the given device, means to count responses of the given device, means to start said counting means substantially simultaneously, and means to stop said counting means susbtantially simultaneously.

9. A system for determining the proportionate number of substandard responses of a given device with respect to the number of excitations of the given device, comprising selective means connected to the output circuit of the given device to discriminate against substandard responses thereof, means to count responses of the given device accepted by said selective means, means to excite the given device repetitively, means to count the individual excitations of the given device, means to start both said counting means simultaneously, and means to stop both said counting means simultaneously.

10. A system according to claim 9 in which the selective means is frequency selective for rejecting responses of nonstandard frequency.

11. A system in accordance with claim 9 in which the selective means comprises power integrating and comparing means for rejecting responses below a selected power level.

12. A system according to claim 9 in which the selective means comprises frequency selective means for rejecting responses of nonstandard frequency and power integrating and comparing means for rejecting responses below a selected power level.

13. A system for determining the proportionate number of substandard responses of a given device with respect to the number of excitations of the given device, comprising pulse generating discriminatory means connected to the output of the given device to discriminate against substandard responses of the given device, said means producing a pulse for each acceptable response of the given device, means to count pulses thus produced, means to excite the given device repetitively, means to count individual excitations of the given device, means to start both said counting means simultaneously, and means to stop both said counting means simultaneously.

14. Device testing means comprising a source of electrical pulses, means for applying pulses from said source to a device to be tested, pulse translating means, means for also applying pulses from said source to said pulse translating means and means for comparing the number of output pulses delivered, respectively, by said device under test and said pulse translating means.

15. Means for monitoring the operation of an electrical device comprising, a source of electrical pulses, means for applying pulses from said source to said device, means for extracting output pulses from said device, comparison means having two inputs for determining the relative occurrence of pulses applied to said two inputs, means for applying pulses from said source to one of said two inputs, means for applying said output pulses to the other of said two inputs and means for converting the pulses applied to said two inputs into waveforms of substantially identical shape.

16. Apparatus for measuring the performance characteristics of an electrical device comprising a source of electrical pulses, a first circuit having an input and an output, said first circuit including said device and having its input connected to receive pulses from said source, means in said first circuit for adjusting the amplitude of the output pulses delivered by said device, a second circuit having an input and output, said second circuit also having its input connected to receive pulses from said source and means for comparing the number of pulses occurring at the output of said first circuit with the number of pulses occurring at the output of said second circuit.

17. Apparatus for indicating the number of pulses that are missing from the output of a pulsed magnetron with respect to the number of input pulses applied thereto comprising, a source of pulses, means for applying pulses from said source to pulse said magnetron, an output circuit for receiving pulses from the output of said magnetron, comparison means having two inputs for deriving an indication of the difference in the number of pulses applied to said two inputs, means for applying pulses from the output of said magnetron to one of said inputs, and means for applying pulses from said source equal in number to the pulses applied to said magnetron to the other of said inputs.

18. Apparatus for determining the pulse transmission characteristics of an electrical device comprising, a source of electrical pulses, means for applying pulses from said source to the input of said device, first pulse translation means connected to receive pulses from the output of said device and for deriving a first pulse wave train, second pulse translation means connected to receive the same number of pulses from said source as are applied to said device and for deriving a second pulse wave train, and comparison means connected to receive said first and second pulse wave trains, said comparison means comprising means for indicating the percentage of pulses in said second train for which there are no corresponding pulses in said first train.

19. The combination in accordance with claim 18 wherein said second pulse translation means comprises means for deriving a train of pulses similar in wave shape and amplitude to the pulses of said first pulse wave train.

20. The method of testing a pulse generator which comprises applying electrical pulses to said generator, shaping the output pulses of said generator, deriving a train of pulses equal in number to the pulses applied to said generator and similar in shape to the shaped output pulses of said generator, and comparing the train of pulses with the shaped output pulses to obtain an indication of the number of output pulses missing from said generator with respect to the number of pulses applied thereto.

References Cited in the file of this patent

UNITED STATES PATENTS

| | | |
|---|---|---|
| 2,403,873 | Mumma | July 9, 1946 |
| 2,403,918 | Grosdoff | July 16, 1946 |
| 2,482,932 | Pyatt et al. | Sept. 27, 1949 |
| 2,558,447 | MacSorley | June 26, 1951 |
| 2,656,460 | McMillan | Oct. 20, 1953 |